(12) United States Patent
Morris

(10) Patent No.: US 11,948,122 B1
(45) Date of Patent: Apr. 2, 2024

(54) SYSTEMS AND METHODS FOR FACILITATING IN-GARAGE DELIVERY

(71) Applicant: The Chamberlain Group LLC, Oak Brook, IL (US)

(72) Inventor: David R. Morris, Glenview, IL (US)

(73) Assignee: The Chamberlain Group, LLC, Oak Brook, IL (US)

( * ) Notice: Subject to any disclaimer, the term of this patent is extended or adjusted under 35 U.S.C. 154(b) by 153 days.

(21) Appl. No.: 17/490,500

(22) Filed: Sep. 30, 2021

(51) Int. Cl.
| | |
|---|---|
| *G06Q 10/083* | (2023.01) |
| *G06V 10/56* | (2022.01) |
| *G06V 10/60* | (2022.01) |
| *G06V 20/10* | (2022.01) |
| *H04N 7/18* | (2006.01) |

(52) U.S. Cl.
CPC ........... *G06Q 10/083* (2013.01); *G06V 10/56* (2022.01); *G06V 10/60* (2022.01); *G06V 20/10* (2022.01); *H04N 7/188* (2013.01)

(58) Field of Classification Search
CPC ...................................................... G06V 10/56
USPC .......................................................... 705/330
See application file for complete search history.

(56) References Cited

U.S. PATENT DOCUMENTS

| | | | |
|---|---|---|---|
| 10,183,424 B1 | 1/2019 | Lisso | |
| 10,370,136 B1 | 8/2019 | Linnell | |
| 10,373,097 B2 | 8/2019 | Kulkarni | |
| 10,510,036 B1 | 12/2019 | Lisso | |
| 10,627,244 B1* | 4/2020 | Lauka ................. | G01C 21/3623 |
| 10,643,079 B2 | 5/2020 | Li | |
| 10,766,651 B2 | 9/2020 | Pettersson | |
| 10,981,680 B2 | 4/2021 | Colson | |
| 2015/0310381 A1* | 10/2015 | Lyman ................. | G06Q 10/083 |
| | | | 705/330 |
| 2018/0197139 A1 | 7/2018 | Hill | |
| 2019/0244448 A1* | 8/2019 | Alamin ............. | G07C 9/00896 |

(Continued)

FOREIGN PATENT DOCUMENTS

| | | | |
|---|---|---|---|
| WO | WO-02099587 A2 * | 12/2002 | ............. G01C 21/26 |
| WO | 2013122999 | 8/2013 | |
| WO | 2017083234 | 5/2017 | |

OTHER PUBLICATIONS

Optimizing Packaging for Supply Chain Transportation Environmental Conditions, The IP.com Prior Art Database, Jun. 11, 2020, https://ip.com/IPCOM/000262558. (Year: 2020).*

*Primary Examiner* — Jeff Zimmerman
*Assistant Examiner* — Hunter A Molnar
(74) *Attorney, Agent, or Firm* — DORITY & MANNING, P.A.

(57) ABSTRACT

Apparatuses and methods are provided herein for facilitating in-garage delivery. In some embodiments, there is provided a system for facilitating in-garage delivery including a memory configured to store computer-readable instructions; communication circuitry configured to receive image data representative of an interior of a garage captured by an imaging device; and a processor operably coupled to the memory and the communication circuitry, the processor configured to execute the computer-readable instructions to: process the image data to determine a characteristic of the interior of the garage; select a packaging for an item to be delivered to the garage based at least in part on the characteristic of the interior of the garage; and effect delivery to the garage of the item with the selected packaging.

39 Claims, 5 Drawing Sheets

(56) References Cited

U.S. PATENT DOCUMENTS

2021/0064709 A1\* 3/2021 Trim ...................... B33Y 50/00
2022/0019810 A1\* 1/2022 Farber ..................... H04N 7/18

\* cited by examiner

SYSTEMS AND METHODS FOR FACILITATING IN-GARAGE DELIVERY

TECHNICAL FIELD

This disclosure relates generally to facilitating in-garage delivery.

BACKGROUND

Generally, when a product is delivered to a residence, such as a house, the product is either left by a door, at the mailbox, or a person at the residence receives the delivery upon providing a release such as a signature to a delivery person/agent/associate. As such, the delivery of the product may be visible to a thief, exposed to the outside environment, and/or inconvenient to the recipient. To address the foregoing issues, some merchants offer unattended delivery of ordered/purchased items to a secure(d) area such as a residential garage. Such unattended in-garage delivery, however, continues to be performed by packaging the item in a delivery carton such as a corrugated paper (e.g. cardboard) box. Use of a delivery carton, in certain instances, may excessively consume resources, for example, extra time and materials are expended to package an item for delivery although such item may be suitably delivered substantially as-is.

BRIEF DESCRIPTION OF THE DRAWINGS

Disclosed herein are embodiments of systems, apparatuses and methods pertaining to facilitating in-garage delivery. This description includes drawings, wherein.

Figure 1:
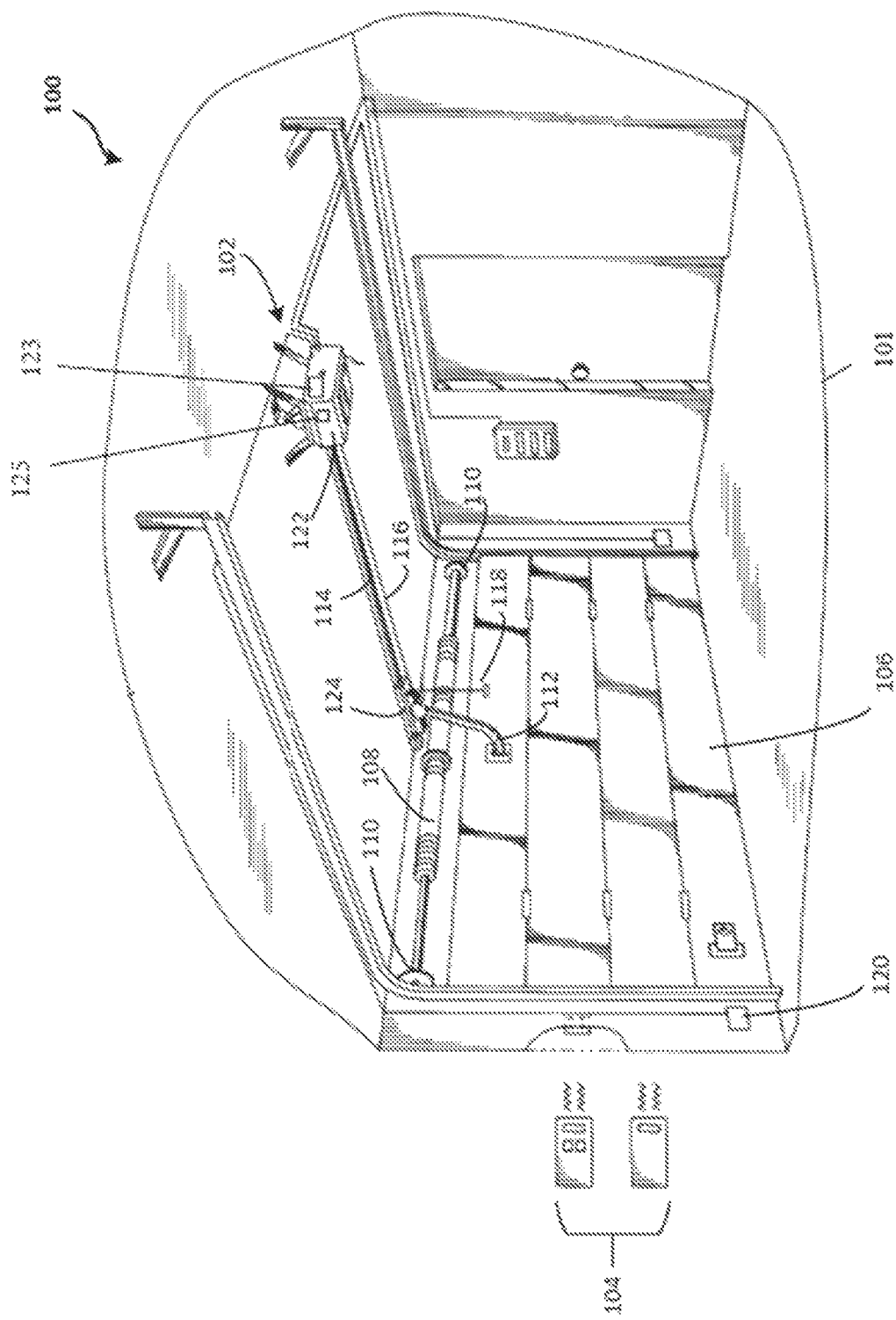
FIG. 1 is a view of an example garage door operator system for operating a garage door of a garage.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that may be useful or implemented in a commercially available embodiment are often not depicted in order to facilitate a less obstructed view of these various embodiments of the present disclosure. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, provided herein are systems, apparatuses and methods for facilitating in-garage delivery. In some embodiments, the system for facilitating in-garage delivery includes a processor operably coupled to a memory and a communication circuitry. The memory stores computer-readable instructions. The communication circuitry may receive image data representative of an interior of a garage captured by an imaging device. The processor may execute the computer-readable instructions to process the image data to determine a characteristic of the interior of the garage. In some embodiments, the processor executes the computer-readable instructions to select a packaging for an item to be delivered to the garage based at least in part on the characteristic of the interior of the garage. The processor may execute the computer-readable instructions to effect delivery to the garage of the item with the selected packaging.

In some embodiments, a method for facilitating in-garage delivery includes storing, by a memory, computer-readable instructions. The method includes receiving, via communication circuitry, image data representative of an interior of a garage captured by an imaging device. The method includes executing, by a processor operably coupled to the memory and the communication circuitry, the computer-readable instructions to: process the image data to determine a characteristic of the interior of the garage; select a packaging for an item to be delivered to the garage based at least in part on the characteristic of the interior of the garage; and effect delivery to the garage of the item with the selected packaging.

In some embodiments, a non-transitory computer-readable medium storing instructions which, when executed, cause performance of a method for facilitating in-garage delivery. Performance of the method includes: storing, by a memory, computer-readable instructions; receiving, via communication circuitry, image data representative of an interior of a garage captured by an imaging device; and executing, by a processor operably coupled to the memory and the communication circuitry the computer-readable instructions to: process the image data to determine a characteristic of the interior of the garage; select a packaging for an item to be delivered to the garage based at least in part on the characteristic of the interior of the garage; and effect delivery to the garage of the item with the selected packaging.

Referring now to FIG. 1, an example garage door operator system 100 for operating a garage door 106 is provided. In one embodiment, the garage door operator system 100 includes a garage door operator 102 and one or more remote controls such as a transmitter 104. The one or more remote controls may include, for example, a user device such as a smartphone, an in-vehicle device such as a head unit or infotainment system coupled to an in-vehicle transmitter, a keypad, a wall control, a visor-mounted remote control, and/or a handheld transmitter such as a key fob. The garage door operator 102 includes an electric motor 122, communication circuitry 123, and a control circuit (including a processor 125). In some embodiments, the garage door operator includes a rail 116 and transmission member 114 such as a chain, belt, or screw driven by the electric motor 122 relative to the rail 116. The electric motor 122 is operable to move the garage door 106 between open and closed positions. For example, a trolley 124 is coupled to the transmission member 114 as well as an arm 112 that is attached to the garage door 106. The electric motor 122 shifts the trolley 124 back-and-forth along the rail 116 to lift and lower the garage door 106. A release mechanism 118 is coupled to the trolley 124 to allow the garage door 106 to be disconnected from the garage door operator 102 for manual operation, such as during a power failure.

The garage door operator system 100 includes a cable mechanism 110 that is attached to the garage door 106. The cable mechanism 110 includes a drum and a corresponding cable on opposing sides of the garage door 106, with the drums coupled with a rotating shaft (known as a "jackshaft") above the garage door 106 for taking up and paying out respective cables as the garage door operator 102 lifts and lowers the garage door 106. The drum of the cable mechanism 110 couples to a counterbalance such as a torsion spring 108 that assists in lifting the weight of the garage door 106 and enables the garage door operator 102 to open or close the garage door 106 via movement of the trolley 124. In some embodiments, an optical sensor such as a photo eye system 120 senses an object and/or a human who may be in the way of the garage door 106 as the garage door 106 closes.

Figure 2:
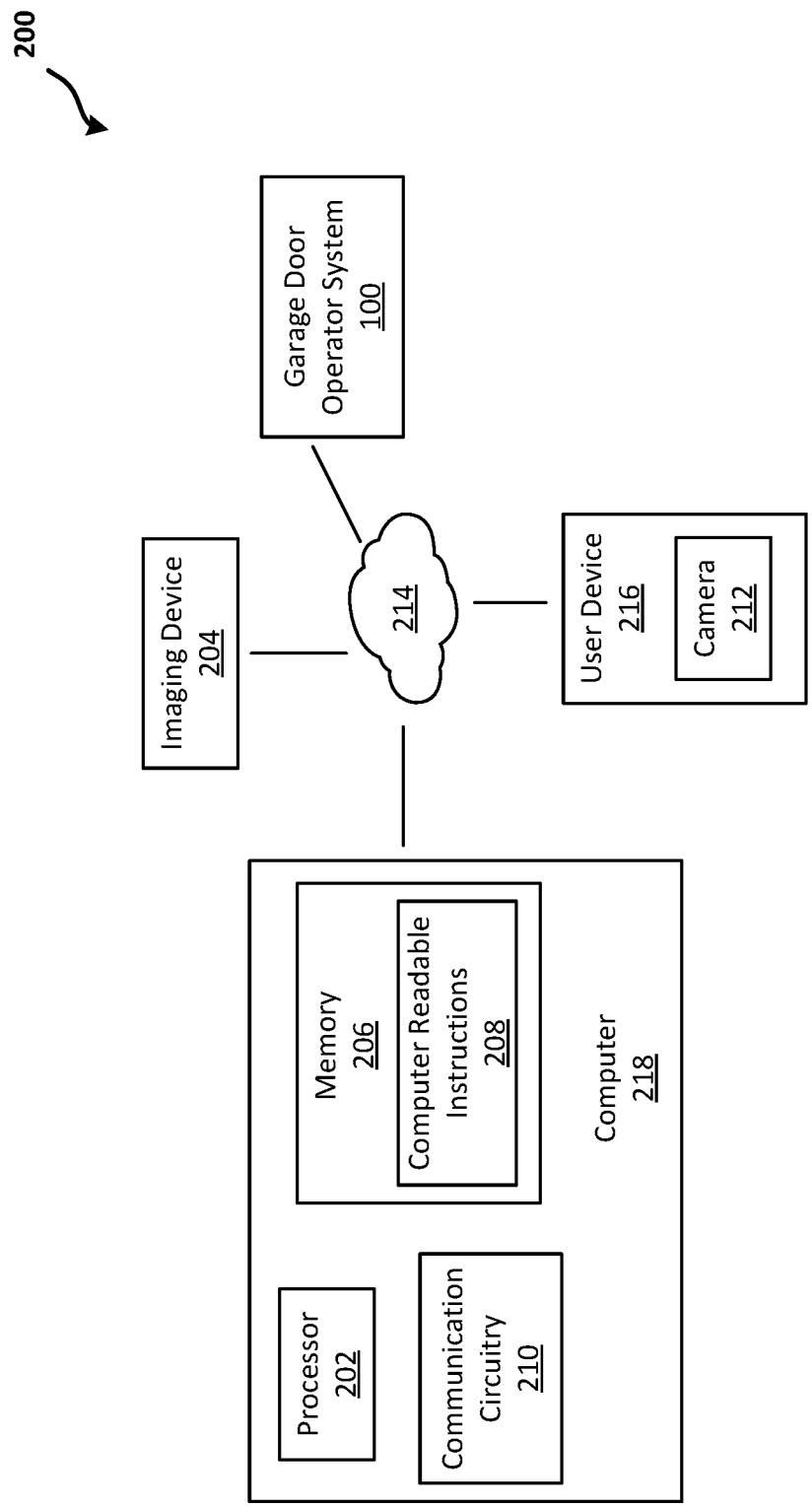
FIG. 2 is a block diagram of an example in-garage delivery system for facilitating delivery of an item to the garage of FIG. 1.
Figure 5:
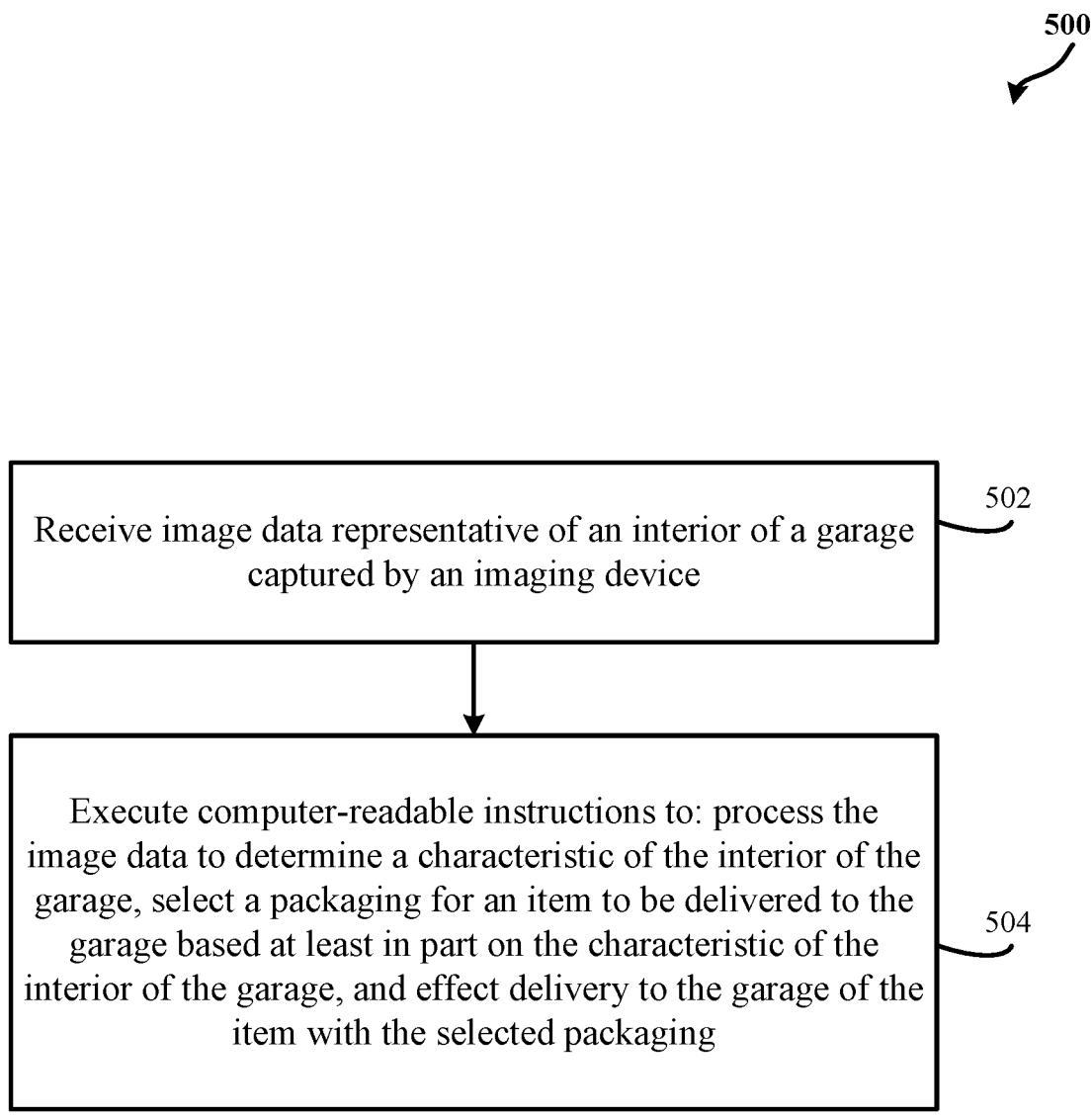
FIG. 5 shows a flow diagram of an example method of facilitating in-garage delivery in accordance with some embodiments.

Referring now to FIGS. 2 and 5, FIG. 2 is a block diagram showing an example in-garage delivery system 200 for facilitating delivery of an item to a garage, such as a garage 101 of FIG. 1. The item to be delivered to the garage may have been an item ordered from an online marketplace, an online retailer, or a scheduled delivery from a brick-and-mortar store, for example. The in-garage delivery system 200 includes a processor 202 operably coupled to a memory 206, which stores computer-readable instructions 208, and a communication circuitry 210. In some embodiments, the processor 202, the memory 206, and the communication circuitry 210 are components of one or more computers 218, such as one or more server computers, a cloud computing system, etc. FIG. 5 shows a flow diagram of an example method 500 of facilitating in-garage delivery utilizing the in-garage delivery system 200. In some embodiments, the computer-readable instructions 208 and one or more characteristics of an item to be delivered to the garage are stored in the memory 206. Uses of singular terms such as "a character" and "an item" are intended to cover both the singular and the plural. In some embodiments, at block 502, the communication circuitry 210 receives image data representative of an interior of a garage captured by an imaging device 204. In some embodiments, the in-garage delivery system 200 includes an imaging device 204.

In some embodiments, the processor 202 causes the imaging device 204 to capture a plurality of images. The processor 202 may select one or more images of the plurality of images based at least in part on the one or more images being captured proximate the projected time of delivery of the item to the garage. In some embodiments, the imaging device 204 includes a video camera (e.g., a digital camera), a camera/imaging module which is an element of a still or video camera, a constituent part thereof such as a CMOS or CCD-type image sensor, and/or a visible light-based camera. In some embodiments, the imaging device 204 includes a laser scanner that can be used to generate or otherwise output one or more models of the garage interior in three dimensions. In some embodiments, the imaging device 204 may include a camera integrated with the system 100 (e.g. a garage door operator with a unitary or built-in camera module), a stand-alone camera, and/or a camera 212 associated with a user device 216. In some embodiments, the user device 216 includes a smartphone, a tablet computer, a smartwatch, and/or various other portable electronic devices capable of commutatively coupling with another electronic device (e.g., the processor 202 and the garage door operator system 100). Regardless of its type and form, the imaging device 204 captures an image of a scene of an interior portion (or substantial entirety) of the garage, and outputs image data representative of the scene. Such image data may be captured and/or output in one or more formats such as a raw image, bitmap, or using compression or encoding technique(s). When the imaging device 204 is embodied as a laser scanner or the like, the image data output therefrom may be a three-dimensional model in one or more formats such as STL, OBJ, PLY and others.

In some embodiments, the processor 202 may effectuate, via the communication circuitry 210, a user device 216 prompting a user to capture at least one image of the interior of a garage using a camera 212 of the user device 216 upon a determination that the imaging device 204 is unable to provide the image of the interior of the garage. For example, the processor 202 transmits a control data to the user device 216 via an application programming interface causing the user device 216 to display a message banner prompting the user to capture at least one image of the interior using the camera 212 of the user device 216. The processor 202 may receive, via the communication circuitry 210, the at least one image captured by the user device 216 and/or processes the at least one image captured by user device 216 to determine the characteristic of the interior of the garage. Alternatively or additionally, one or more of the user device 216, the imaging device 204, or the garage door operator system 100 (or the garage door operator 102 thereof) may process the at least one image and/or receive image data for processing/analyzing in order to determine the characteristic of the interior of the garage.

In some embodiments, the communication circuitry 210 receives a communication from the garage door operator system 100 of the garage that indicates a change of state of the garage door. For example, the garage door operator may be operable to move the garage door between open and closed positions. In some embodiments, the imaging device 204 captures an image relative to the change of state of the garage door. That is, the change of state acts as a trigger for the computer 218 to effect capture, by the imaging device, of an image of the garage interior. For example, the imaging device 204 captures the image immediately before, immediately after, or while the garage door moves up and/or down.

The processor 202 may utilize the computer-readable instructions 208 to analyze the image data. In some embodiments, at block 504, the processor 202 executes the computer-readable instructions 208 to process the image data to determine a characteristic of the interior of the garage; select or identify or recommend a packaging for an item to be delivered to the garage based at least in part on the characteristic of the interior of the garage; and effect delivery to the garage of the item with the selected packaging.

In some embodiments, the processor 202 selects the packaging for the item based at least in part on the characteristic(s) of the interior of the garage and the characteristic(s) of the item to be delivered to the garage as described below in connection with FIGS. 3 and 4. For example, a characteristic of an item to be delivered may include at least one of: dimensions of the item, a color of the item or of the retail packaging of the item, and fragility of the item. In some embodiments, the processor 202, the memory 206, the imaging device 204, the communication circuitry 210, the garage door operator system 100, and/or the user device 216 may be communicatively coupled via a communication network 214. In some embodiments, the communication network 214 may include one or more wide-area and short-range wireless and wired approaches such as the Internet, Bluetooth, WLAN/Wi-Fi, cellular network (e.g., 3G, 4G, 5G, etc.) and/or various communication paths. In some embodiments, the processor 202 selects the packaging for the item to be delivered to the garage from a group consisting of: retail packaging(s) of the item, a high-conspicuity packaging, a protective packaging, and/or a delivery carton. In some embodiments, the delivery carton includes corrugated material, non-corrugated (e.g., paperboard) material, and/or a paper-based product, such as a bag or envelope, to name a few. Furthermore, the high-conspicuity (or highly conspicuous) packaging may be a brightly colored (e.g. yellow, red, orange, etc.) paper or biodegradable material that attaches to, wraps about or encloses the item to improve visibility and/or detectability of the item.

In some embodiments, the computer-readable instructions 208 may include a machine learning model trained to process one or more captured images of the garage and determine characteristics of the interior of the garage. A packaging of an item to be delivered to the garage is customized based at least in part on the determined characteristics of the interior of the garage. In some embodiments, the machine learning model may utilize one or more machine learning algorithms, such as supervised learning, unsupervised learning, reinforcement learning, binary classification, Support Vector Machine (SVM), artificial neural networks, convolutional neural networks, You Only Look Once (YOLO), RetinaNet, Regional based CNN (RCNN), Fast-RCNN, Faster-RCNN, and Mask RCNN. In some embodiments, the machine learning algorithm may iteratively input a plurality of images of the garage captured at various times to train the machine learning model to determine one or more characteristics of the interior of the garage within a predetermined accuracy. The computer-readable instructions 208, when executed, may alternatively or additionally cause performance of one or more imaging and/or image-processing techniques relative to the image data including, for example, computer vision, object recognition, edge detection (e.g. to distinguish a garage floor from a garage door or wall), etc.

Figure 3:
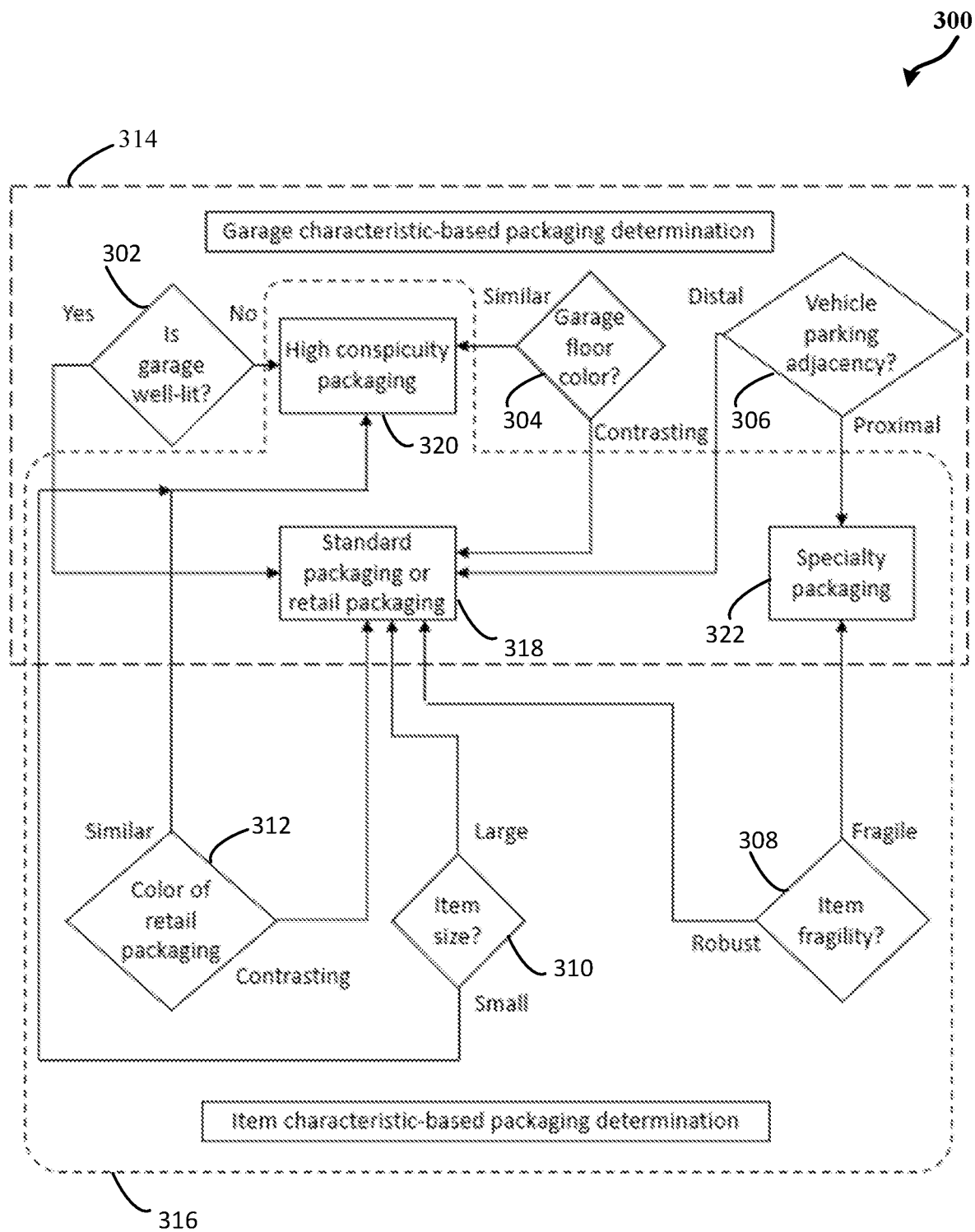
FIG. 3 shows a flow diagram of an example method of facilitating in-garage delivery in accordance with some embodiments.
Figure 4:
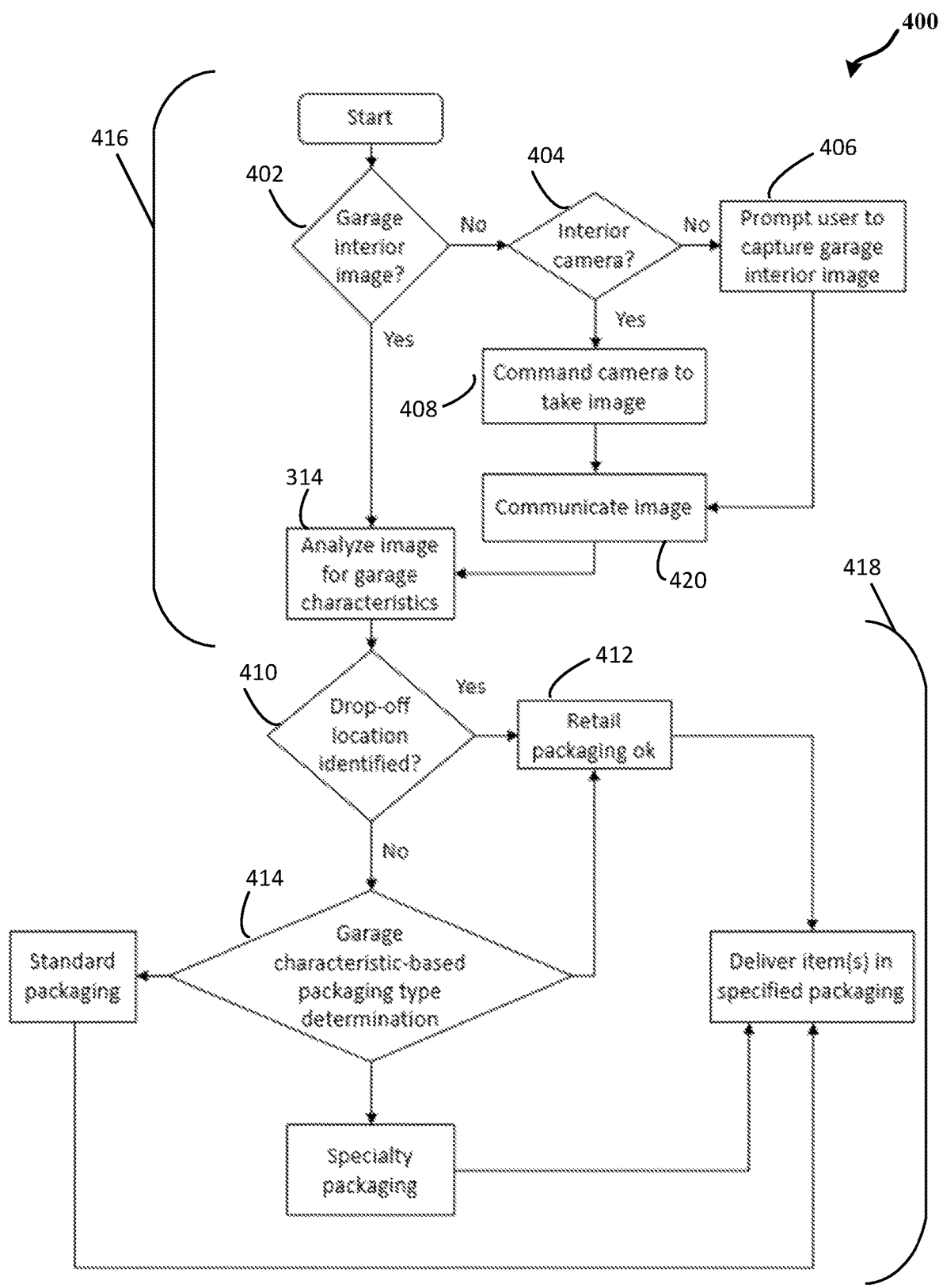
FIG. 4 shows a flow diagram of an example method of facilitating in-garage delivery in accordance with some embodiments.

Illustrative non-limiting examples of methods 300, 400 of facilitating in-garage delivery in accordance with some embodiments are shown in FIGS. 3 and 4. For example, the method 300 of FIG. 3 includes the processor 202 executing the computer-readable instructions 208 to process image data to select packaging for an item based on a characteristic of the garage as shown in block 314 and/or characteristic(s) associated with one or more items to be delivered to the garage as shown in block 316. In some embodiments, at step 302, the processor 202 in executing the computer-readable instructions 208 determines whether the garage is well-lit. By one approach, at step 318, if the garage is well-lit, the processor 202 selects no packaging other than the retail packaging of the item. By another approach, at step 320, if the garage is not well-lit, the processor 202 selects the packaging that is highly conspicuous or visible such that the packaging can be seen readily even at substandard lighting and/or no lighting at all. By selecting a highly conspicuous packaging, attention can be called to the delivered item such that the item is not struck or driven over by a vehicle, and such that the item can be readily seen and located inside the garage, for example. In some instances the high conspicuity packaging may include a non-visual portion to call attention to the item. Such a non-visual portion may be configured to output an odorant, a haptic/vibration signal, a sound, or a combination thereof. For example a non-visual portion may include a device included in or otherwise coupled to the packaging such as a speaker for outputting an audible warning or alert such as beeping.

In some embodiments, at step 304, the processor 202 in executing the computer-readable instructions 208 determines a color of the garage floor as a garage interior characteristic of interest. Additionally it may be determined whether the color of the garage floor is substantially similar to the color or colors of the item to be delivered. By one approach, at step 318, if the color of the item (or the color of the retail packaging of the item) is contrasting to the color of the garage floor, the processor 202 selects standard packaging or no packaging other than the retail packaging of the item. By another approach, at step 320, if the color of the garage floor (e.g. cement gray) is similar to the color of the item or to the color of the item's packaging (e.g. a gray box), the processor 202 selects packaging that is highly conspicuous such that the packaging can be seen readily even at substandard lighting and/or no lighting at all.

In some embodiments, at step 306, the processor 202 in executing the computer-readable instructions 208 determines whether the area in which the delivery item is to be placed is adjacent to where a vehicle is typically parked in the garage. By one approach, at step 318, if the delivery area is distant from the vehicle, the processor 202 selects standard packaging or no packaging other than the retail packaging of the item. By another approach, at step 322, if the area is proximate the vehicle, the packaging used is a specialty packaging (e.g., hardshell, well padded, and/or any type of packaging that can withstand a bump and/or contact from a vehicle that is being parked). In an example, a substantially spherical encapsulation or enclosure (e.g., of rigid foam or other material) about an item may roll away from a vehicle wheel upon contact such that damage to the item inside is obviated. In some embodiments, the specialty packaging may include a packaging having a bright color, a blinking/strobing light, and/or a reflector to enable the customer to see the item despite the headlights of the vehicle.

Turning now to block 316, in some embodiments execution of the computer-readable instructions 208 additionally or alternatively include determining a characteristic of the item to be delivered. As previously mentioned with respect to steps 302 and 304, a characteristic of the garage interior may be reconciled with a characteristic of the item to be delivered in order to select a particular packaging. That is, both of the item characteristic and the garage interior characteristic are used. However, in certain instances the item characteristic may be weighted higher or lower relative to the garage interior characteristic when determining whether a particular packaging is to be selected. As shown at step 308, the processor 202 in executing the computer-readable instructions 208 determines whether the item to be delivered is fragile. By one approach, at step 322, if the item is fragile, the processor 202 selects a packaging specialty packaging (e.g., hardshell, well padded, and/or any type of packaging that can withstand rough handling/transportation and/or delivery (e.g. a drop from a predetermined height), a bump and/or contact from a vehicle that is being parked). By another approach, at step 318, if the item is not fragile, the processor 202 selects standard packaging or no packaging other than the retail packaging of the item.

In some embodiments, at step 310, the processor 202 in executing the computer-readable instructions 208 determines whether the size and/or overall dimensions of the item to be delivered is considered large or small relative to a threshold overall dimensions or size. By one approach, at step 318, if the size and/or overall dimensions is large, the processor 202 selects standard packaging or no packaging other than the retail packaging of the item. By another approach, at step 320, if the size and/or overall dimensions is small, the processor 202 selects highly conspicuous packaging such that the packaging can be seen readily even at substandard lighting and/or no lighting at all.

In some embodiments, at step 312, the processor 202 in executing the computer-readable instructions 208 determines whether the color(s) of the retail packaging of the item is/are similar or contrasting relative to the color of the garage floor. By one approach, at step 318, if the color(s) of the retail packaging of the item is/are contrasting to the color of the garage floor, the processor 202 selects standard packaging or no packaging other than the retail packaging of the item. By another approach, at step 320, if the color(s) of the retail packaging of the item(s) is/are similar to the color of the garage floor, the processor 202 selects packaging that is highly conspicuous such that the packaging can be seen readily even at substandard lighting and/or no lighting at all. In some embodiments, the processor 202 may select between the standard packaging (e.g. a corrugated/cardboard carton) and the retail packaging based on one or more factors that may be dependent or independent from the determined characteristic(s) (e.g., item characteristic and/or garage interior characteristic). In one example a known user may have a predetermined/default preference stored or indicated in a profile, such preference relating to being an environmentally conscious consumer and/or whether a recycling service is available to the user (e.g. the user lives in a building or community that does not recycle). For example, the retail packaging may be used to eliminate unnecessary materials such as plastic bags or styrofoam peanuts or inserts that are difficult to recycle or cannot be recycled and will instead be disposed of after use. In another example, the user may select a packaging preference or indicate a particular packaging request upon placing or submitting their order for purchasing the item. In yet another example, a manufacturer of the item or the vendor/merchant may suggest or mandate a particular packaging type and/or discourage delivery in retail packaging in order to prevent damage such that returns are minimized.

Turning now to FIG. 4, the example method 400 of FIG. 4 includes an analysis portion 416 and a delivery portion 418. In some embodiments, the processor 202 determines whether one or more images of the interior of the garage are available for processing, at step 402. For example, the processor 202 may access the memory 206 to determine whether images are available that were captured on a different day or days proximate a projected time of delivery of the item to the garage. In some embodiments, the processor 202 effects a capture of additional image data of the interior of the garage by the imaging device 204 proximate a projected time of delivery of the item to the garage. By one approach, the additional image data of the interior of the garage may be captured before the projected time of delivery and/or one or more days or hours prior to the day of the projected time delivery, for example. In some embodiments, at step 404, the processor 202 determines whether a camera is operable inside the garage, such as by receiving an operable status communication from the camera. By one approach, at step 406, if a camera is not operable inside the garage, the processor 202 prompts a user during installation of the garage door operator system 100 or during a user setup of an in-garage delivery, for example, to capture an image of the interior of the garage. The user may be given an option by the processor 202 as to when to capture the image. For example, the user may use the camera 212 of the user device 216 to capture the image at the installation or setup time and/or at a time convenient to the user. By another approach, at step 408, if a camera is operable inside the garage, the processor 202 causes the camera inside the garage to capture an image of the interior of the garage and/or analyzes the image, at step 314, to determine characteristic(s) of the interior of the garage. In some embodiments, at step 420, the captured image is provided to and/or communicated to the processor 202. In some embodiments, the characteristic of the interior of the garage includes at least one of lighting in the garage, a color of a floor of the garage, a floor plan of the garage, available floor space in the garage, and a proximity of a parked vehicle to a delivery location in the garage.

In some embodiments, at step 410, the processor 202 in executing the computer-readable instructions 208 determines whether a drop-off location and/or area for the item to be delivered has been identified. In some embodiments, the processor 202 identifies a delivery location within the garage using the image data representative of the interior of the garage captured by the imaging device 204. Alternatively, a drop-off location may be identified based on a user-specified or user-defined location. A user may specify or define a drop-off location physically (e.g. using a receptacle, a sign, etc.) or digitally (e.g. by indicating the location on a virtual floorplan via a client application). By one approach, at step 412, if the drop-off location and/or area has been identified (e.g. a delivery receptacle or area that is detected, determined or otherwise specified in the garage), the processor 202 may determine that the retail packaging of the item to be delivered is/are suitable. For example, the processor 202 may determine suitability of the packaging based on the determination made by the processor 202 at step 316 of FIG. 3. A retail packaging of an item is the packaging of the item when the item left the manufacturer or distributor. In the present disclosure, retail packaging generally refers to packaging that is employed to contain an item for display or merchandising (e.g. on a store shelf). Retail packaging may be embodied in various ways such as, including a corrugated paper carton with artwork, a sealed plastic clamshell through which the item and/or contents are visible, and others. In contrast to retail packaging, herein standard packaging generally refers to a packaging that facilitates shipping and/or handling of a retail-packaged item which is enclosed thereby. Standard packaging typically is considered an additional level or layer of packaging that may be optional in certain instances e.g. relative to the characteristics of the garage interior.

By another approach, at step 414, if the drop-off location and/or area has not been identified, the processor 202 may determine a customized packaging based on the determination made by the processor 202 at step 314 of FIG. 3. In some embodiments, the characteristic of the interior of the garage affects the selected packaging of the item to be delivered in the garage by causing the processor 202 to transmit a message data to the user device 216. For example, upon receipt of the message data, the user device 216 displays a message banner on a display and/or output a text message or email message instructing the user to customize the packaging of the item based on the selected packaging of the processor 202.

In some embodiments, to effect delivery to the garage of the item with the packaging that was selected includes communicating to a delivery associate the delivery location and/or area within the garage. For example, the processor 202 may cause the delivery location and/or area to be communicated to the delivery associate. In an illustrative non-limiting example, the processor 202 transmits a text message or an email message to the user device 216, which is employed by a delivery associate, or causes the user device 216 to display a message banner on a display screen of the user device 216 indicating the delivery location and/or area within the garage to place the item. The delivery associate can be a person, a drone, or a land-based robot. In embodiments where the delivery associate is a drone or a land-based robot, the user device 216 may correspond to a processor of the drone or the land-based robot. In other embodiments, to effect delivery to the garage of the item with the packaging that was selected includes a server computer (218) of a garage door operator system 100 communicating a message or information to another server computer of a merchant or a third-party entity such as a delivery/packaging/handling service that receives the item from the merchant. The communicated message or information may include one or more of: the determined characteristic of the garage interior; and a recommended, selected or identified packaging type based on the determined characteristic.

In some embodiments, the processor 202 identifies a delivery receptacle in the garage using the image data representative of the interior of the garage captured by the imaging device 204. In some embodiments, the delivery receptacle may correspond to a particular delivery location in the garage, such as a bin, a stand, a shelf, and/or a cubby. Effecting delivery to the garage of the item with the selected packaging may include communicating a request to a delivery associate to deliver the item to the delivery receptacle. For example, the processor 202 may cause the request to be provided to the user device 216 associated with the delivery associate. In some embodiments, the request provided to the user device 216 includes an image/picture of the interior of the garage with an arrow or other indicator superimposed on the image/picture to highlight the delivery receptacle.

In some embodiments, the operations of the processor 202 described herein can be performed by the one or more computers 218, the garage door operation system 100, the user device 216, or any combination thereof.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept. Indeed, although the described and illustrated embodiments relate to in-garage delivery of an item, the present disclosure is intended to also facilitate delivery of an item to various secure locations other than a residential garage. As examples, the secure area may be a warehouse, a locked room of a building, an outside area monitored by video camera(s), etc. Accordingly, the present teachings may entail determining a characteristic of a secure area, and based on the characteristic that was determined selecting/identifying/recommending a particular packaging for an item that is to be delivered to the secure area. In one instance where the secure area is outside (e.g. a porch, a yard, and the like) the selected packaging may be a carton that is one or more of waterproof/weatherproof, insulated or temperature-controlled such that damage to the item within the packaging is prevented or minimized relative to precipitation, sun/UV, heat, cold, etc.

What is claimed is:

1. A system for facilitating in-garage delivery, the system comprising:
    a memory configured to store computer-readable instructions;
    communication circuitry configured to receive image data representative of an interior of a garage captured by an imaging device, wherein the image data is associated with an image captured by the imaging device in response to a garage door operator system of the garage causing movement of a garage door of the garage between open and closed positions; and
    a processor operably coupled to the memory and the communication circuitry, the processor configured to execute the computer-readable instructions to:
        control the communication circuitry to send a signal to effect capture of the image data by the imaging device in response to the movement of the garage door;
        process the image data to determine a characteristic of the interior of the garage;
        determine whether a low visibility condition for item delivery exists in the interior of the garage based at least in part upon the characteristic of the interior of the garage;
        select a high-conspicuity packaging for an item to be delivered to the garage in response to existence in the interior of the garage of the low visibility condition for item delivery; and
        effect delivery to the garage of the item with the selected high-conspicuity packaging including causing the garage door operator system to move the garage door to an open position.

2. The system of claim 1 wherein the characteristic of the interior of the garage includes at least one of:
    lighting in the garage;
    a color of a floor of the garage;
    a floor plan of the garage;
    available floor space in the garage; and
    a proximity of a parked vehicle to a delivery location in the garage.

3. The system of claim 1, wherein the memory is configured to store a characteristic of the item to be delivered to the garage; and
    wherein the processor is configured to select the high-conspicuity packaging for the item based at least in part on the characteristic of the interior of the garage and the characteristic of the item to be delivered to the garage.

4. The system of claim 3, wherein the characteristic of the item includes at least one of:
    dimensions of the item;
    a color of retail packaging of the item; and
    fragility of the item.

5. The system of claim 1, wherein the processor is configured to effect capture of additional image data of the interior of the garage by the imaging device proximate a projected time of delivery of the item to the garage.

6. The system of claim 1, wherein the processor is configured to identify a delivery location within the garage using the image data representative of the interior of the garage captured by the imaging device; and wherein to effect delivery to the garage of the item with the selected high-conspicuity packaging includes communicating to a delivery associate the delivery location within the garage.

7. The system of claim 6, wherein the processor is configured to identify a delivery receptacle in the garage as the delivery location using the image data representative of the interior of the garage captured by the imaging device; and wherein to effect delivery to the garage of the item with the high-conspicuity packaging that was selected includes communicating a request to a delivery associate to deliver the item to the delivery receptacle.

8. The system of claim 1, wherein the processor is configured to select the high-conspicuity packaging for the item from a group consisting of:

retail packaging of the item;
standard high-conspicuity packaging;
protective high-conspicuity packaging; and
a delivery carton.

9. The system of claim 1, in combination with the imaging device.

10. The system of claim 1, wherein the processor causes the imaging device to capture a plurality of images; and wherein the processor is configured to select one or more images of the plurality of images based at least in part on the one or more images being captured proximate a projected time of delivery of the item to the garage.

11. A system for facilitating in-garage delivery, the system comprising:

a memory configured to store computer-readable instructions;

communication circuitry configured to receive image data representative of an interior of a garage captured by an imaging device, wherein the image data is associated with an image captured by the imaging device in response to a garage door operator system of the garage causing movement of a garage door of the garage between open and closed positions; and a processor operably coupled to the memory and the communication circuitry, the processor configured to execute the computer-readable instructions to:

control the communication circuitry to send a signal to effect capture of the image data by the imaging device in response to the movement of the garage door;

process the image data to determine a characteristic of the interior of the garage;

select a packaging for an item to be delivered to the garage based at least in part on the characteristic of the interior of the garage; and effect delivery to the garage of the item with the selected packaging including causing the garage door operator system to move the garage door to an open position;

wherein the processor is configured to effectuate, via the communication circuitry, a user device prompting a user to capture at least one image of the interior using a camera of the user device upon a determination that the imaging device is unable to provide the image data representative of the interior of the garage;

wherein the processor is configured to receive, via the communication circuitry, the at least one image captured by the user device; and wherein the processor is configured to process the at least one image captured by the user device to determine the characteristic of the interior of the garage.

12. A method for facilitating in-garage delivery, the method comprising:

receiving, at a communication circuitry, image data representative of an interior of a garage captured by an imaging device, wherein the image data is associated with an image captured by the imaging device in response to a garage door operator system of the garage causing movement of a garage door of the garage between open and closed positions; and executing, by a processor operably coupled to a memory and the communication circuitry, computer-readable instructions stored in the memory to:

control the communication circuitry to send a signal to effect capture of the image data by the imaging device in response to the movement of the garage door;

process the image data to determine a characteristic of the interior of the garage;

determine whether a low visibility condition for item delivery exists in the interior of the garage based at least in part upon the characteristic of the interior of the garage;

select a high-conspicuity packaging for an item to be delivered to the garage in response to existence in the interior of the garage of the low visibility condition for item delivery; and effect delivery to the garage of the item with the selected high-conspicuity packaging including causing the garage door operator system to move the garage door to an open position.

13. The method of claim 12, wherein the characteristic of the interior of the garage includes at least one of:

lighting in the garage;
a color of a floor of the garage;
a floor plan of the garage;
available floor space in the garage; and
a proximity of a parked vehicle to a delivery location in the garage.

14. The method of claim 12, wherein the memory is configured to store a characteristic of the item to be delivered to the garage; and wherein the processor is configured to select the high-conspicuity packaging for the item based at least in part on the characteristic of the interior of the garage and the characteristic of the item to be delivered to the garage.

15. The method of claim 14, wherein the characteristic of the item includes at least one of:

dimensions of the item;
a color of retail packaging of the item; and
fragility of the item.

16. The method of claim 12, further comprising effecting, by the processor, capture of additional image data of the interior of the garage by the imaging device proximate a projected time of delivery of the item to the garage.

17. The method of claim 12, further comprising identifying, by the processor, a delivery location within the garage using the image data representative of the interior of the garage captured by the imaging device, wherein effecting delivery to the garage of the item with the high-conspicuity packaging that was selected includes communicating to a delivery associate the delivery location within the garage.

18. The method of claim 17, further comprising identifying, by the processor, a delivery receptacle in the garage as the delivery location using the image data representative of the interior of the garage captured by the imaging device, wherein effecting delivery to the garage of the item with the selected high-conspicuity packaging includes communicating a request to a delivery associate to deliver the item to the delivery receptacle.

19. The method of claim 12, wherein selecting the packaging for the item includes selecting the high-conspicuity packaging for the item from a group consisting of:
   retail packaging of the item;
   standard high-conspicuity packaging;
   protective high-conspicuity packaging; and
   a delivery carton.

20. The method of claim 12, further comprising:
   causing, by the processor, the imaging device to capture a plurality of images; and
   selecting, by the processor, one or more images of the plurality of images based at least in part on the one or more images being captured proximate a projected time of delivery of the item to the garage.

21. A method for facilitating in-garage delivery, the method comprising:
   receiving, at a communication circuitry, image data representative of an interior of a garage captured by an imaging device, wherein the image data is associated with an image captured by the imaging device in response to a garage door operator system of the garage causing movement of a garage door of the garage between open and closed positions;
   executing, by a processor operably coupled to a memory and the communication circuitry, computer-readable instructions stored in the memory to:
      control the communication circuitry to send a signal to effect capture of the image data by the imaging device in response to the movement of the garage door;
      process the image data to determine a characteristic of the interior of the garage;
      select a packaging for an item to be delivered to the garage based at least in part on the characteristic of the interior of the garage; and
      effect delivery to the garage of the item with the selected packaging including causing the garage door operator system to move the garage door to an open position;
   effectuating, by the processor via the communication circuitry, a user device prompting a user to capture at least one image of the interior using a camera of the user device upon a determination that the imaging device is unable to provide the image data representative of the interior of the garage;
   receiving, by the processor via the communication circuitry, the at least one image captured by the user device; and
   processing, by the processor, the at least one image captured by the user device to determine the characteristic of the interior of the garage.

22. A non-transitory computer-readable medium storing instructions which, when executed, cause performance of a method for facilitating in-garage delivery, the method comprising:
   receiving, at a communication circuitry, image data representative of an interior of a garage captured by an imaging device, wherein the image data is associated with an image captured by the imaging device in response to a garage door operator system of the garage causing movement of a garage door of the garage between open and closed positions;
   control the communication circuitry to send a signal to effect capture of the image data by the imaging device in response to the movement of the garage door;
   processing, via a processor in communication with the communication circuitry, the image data to determine a characteristic of the interior of the garage;
   determining, via the processor, whether a low visibility condition for an item exists in the interior of the garage based at least in part upon the characteristic of the interior of the garage;
   selecting, via the processor, a high-conspicuity packaging for the item to be delivered to the garage in response to existence in the interior of the garage of the low visibility condition for item delivery; and
   effecting delivery to the garage of the item with the high-conspicuity packaging that was selected including causing the garage door operator system to move the garage door to an open position.

23. The non-transitory computer-readable medium of claim 22, wherein the method further comprises effecting, by the processor, capture of additional image data of the interior of the garage by the imaging device proximate a projected time of delivery of the item to the garage.

24. The non-transitory computer-readable medium of claim 22, wherein the method further comprises identifying, by the processor, a delivery location within the garage using the image data representative of the interior of the garage captured by the imaging device,
   wherein effecting delivery to the garage of the item with the selected high-conspicuity packaging includes communicating to a delivery associate the delivery location within the garage.

25. The non-transitory computer-readable medium of claim 24, wherein the method further comprises identifying, by the processor, a delivery receptacle as the delivery location in the garage using the image data representative of the interior of the garage captured by the imaging device,
   wherein effecting delivery to the garage of the item with the selected high-conspicuity packaging includes communicating a request to a delivery associate to deliver the item to the delivery receptacle.

26. The non-transitory computer-readable medium of claim 22, wherein selecting the packaging for the item includes selecting packaging for the item from a group consisting of:
   retail packaging of the item;
   standard high-conspicuity packaging;
   protective high-conspicuity packaging; and
   a delivery carton.

27. The non-transitory computer-readable medium of claim 22, wherein the characteristic of the interior of the garage includes at least one of:
   lighting in the garage;
   a color of a floor of the garage;
   a floor plan of the garage;
   available floor space in the garage; and
   a proximity of a parked vehicle to a delivery location in the garage.

28. The non-transitory computer-readable medium of claim 22, wherein the method further comprises:
   storing, by a memory operably coupled to the processor and the communication circuitry, a characteristic of the item to be delivered to the garage; and
   selecting, by the processor, the high-conspicuity packaging for the item based at least in part on the characteristic of the interior of the garage and the characteristic of the item to be delivered to the garage.

29. The non-transitory computer-readable medium of claim 28, wherein the characteristic of the item includes at least one of:
- dimensions of the item;
- a color of retail packaging of the item; and
- fragility of the item.

30. The system of claim 11 wherein the characteristic of the interior of the garage includes at least one of:
- lighting in the garage;
- a color of a floor of the garage;
- a floor plan of the garage;
- available floor space in the garage; and
- a proximity of a parked vehicle to a delivery location in the garage.

31. The system of claim 11, wherein the memory is configured to store a characteristic of the item to be delivered to the garage; and
wherein the processor is configured to select the packaging for the item based at least in part on the characteristic of the interior of the garage and the characteristic of the item to be delivered to the garage.

32. The system of claim 31, wherein the characteristic of the item includes at least one of:
- dimensions of the item;
- a color of retail packaging of the item; and
- fragility of the item.

33. The system of claim 11, wherein the processor is configured to effect capture of additional image data of the interior of the garage by the imaging device proximate a projected time of delivery of the item to the garage.

34. The system of claim 11, wherein the processor is configured to identify a delivery location within the garage using the image data representative of the interior of the garage captured by the imaging device; and
wherein to effect delivery to the garage of the item with the selected packaging includes communicating to a delivery associate the delivery location within the garage.

35. The system of claim 34, wherein the processor is configured to identify a delivery receptacle in the garage as the delivery location using the image data representative of the interior of the garage captured by the imaging device; and
wherein to effect delivery to the garage of the item with the packaging that was selected includes communicating a request to a delivery associate to deliver the item to the delivery receptacle.

36. The system of claim 11, wherein the processor is configured to select the packaging for the item from a group consisting of:
- retail packaging of the item;
- standard high-conspicuity packaging;
- protective high-conspicuity packaging; and
- a delivery carton.

37. The system of claim 11, in combination with the imaging device.

38. The system of claim 11, wherein the processor causes the imaging device to capture a plurality of images; and
wherein the processor is configured to select one or more images of the plurality of images based at least in part on the one or more images being captured proximate a projected time of delivery of the item to the garage.

39. A non-transitory computer-readable medium storing instructions which, when executed, cause performance of a method for facilitating in-garage delivery, the method comprising:
receiving, at a communication circuitry, image data representative of an interior of a garage captured by an imaging device, wherein the image data is associated with an image captured by the imaging device in response to a garage door operator system of the garage causing movement of a garage door of the garage between open and closed positions;
control the communication circuitry to send a signal to effect capture of the image data by the imaging device in response to the movement of the garage door;
processing, via a processor in communication with the communication circuitry, the image data to determine a characteristic of the interior of the garage;
selecting, via the processor, a packaging for an item to be delivered to the garage based at least in part on the characteristic of the interior of the garage; and
effecting delivery to the garage of the item with the selected packaging including causing the garage door operator system to move the garage door to an open position;
wherein the processor is configured to effectuate, via the communication circuitry, a user device prompting a user to capture at least one image of the interior using a camera of the user device upon a determination that the imaging device is unable to provide the image data representative of the interior of the garage;
wherein the processor is configured to receive, via the communication circuitry, the at least one image captured by the user device; and
wherein the processor is configured to process the at least one image captured by the user device to determine the characteristic of the interior of the garage.

* * * * *